July 2, 1957          J. R. IRVIN          2,797,967
ENDLESS TREAD WITH DETACHABLE LUG
Filed March 15, 1954
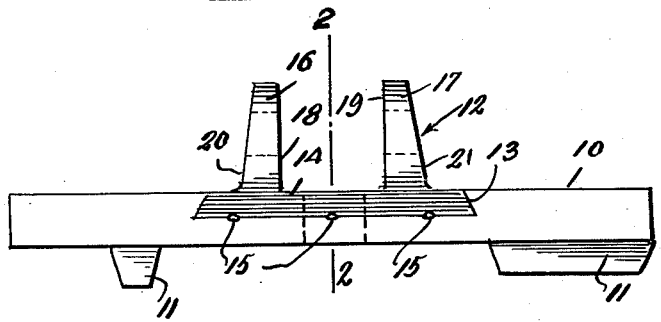
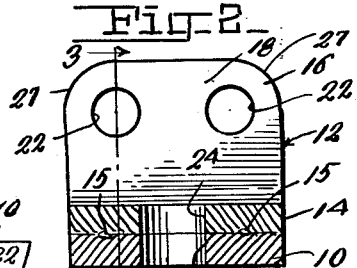
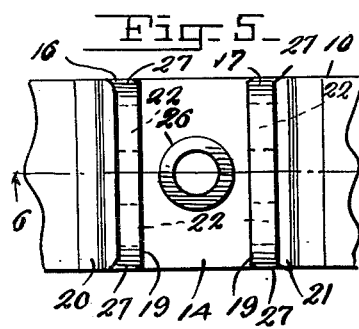
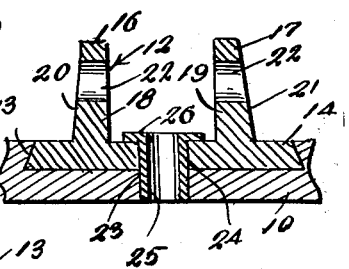
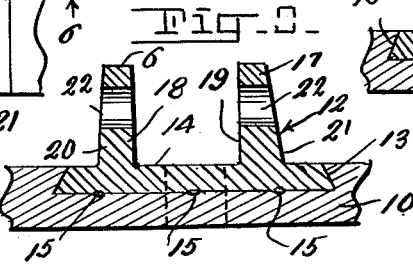
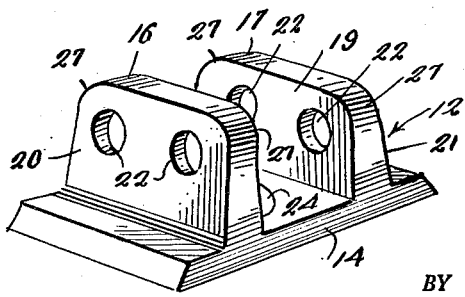
*INVENTOR.*
JOSEPH R. IRVIN
BY
*Patrick D. Beavers*
ATTORNEY

United States Patent Office 2,797,967
Patented July 2, 1957

2,797,967

ENDLESS TREAD WITH DETACHABLE LUG

Joseph R. Irvin, Portage, Pa.

Application March 15, 1954, Serial No. 416,235

1 Claim. (Cl. 305—10)

This invention relates to improvements in endless treads and more particularly to a detachable lug for the tread plate or pad of the endless tread which can be easily removed and replaced when damaged.

It is a well-known fact that the tread plate or pad of an endless tread is practically indestructible due to the low factor of breakage stress and wearing effect. However, the lug section is short lived, since it is more fragile in construction and is subjected to intense power stress and wear. Thus, there is resultant failure of the lug by reason of breakage or the wearing and enlargement of the lug holes or eyes to the point where the linkage pin or rivet cannot be retained.

An object of this invention, therefore, is to provide a detachable lug that can be easily removed and replaced so that the tread plate or pad is not lost for further use, thus, saving the expensive materials from which the tread plate or pad is cast.

Another object of the invention is to provide a detachable lug, the replacement of which can be made at the location of the failure, thus simplifying the maintenance of endless tread driven machines and minimizing delay in using the machine and saving the cost of an entirely new caterpillar tread assembly.

Another object of the invention is to provide an endless tread having a detachable lug that is applicable to any type of endless tread driven machine or vehicle having single or multiple link line endless tread traction chains.

A further object of this invention is to provide a tread plate or pad for an endless tread that has a detachable lug, the same being especially designed to replace the conventional type of endless tread which has the lug and tread plate or pad cast in one piece.

The lug embodying the present invention is cast and machine shaped to exact dimensions to provide a perfect fit with the tread plate or pad to form the endless tread and the lug can be removed manually with the use of a hammer and replaced and retained by spot welds or by a hollow tubular stay-pin without loss of the tread plate or pad.

With the above and other objects and advantages in view the invention consists of the minor details of construction, arrangement and combination of parts more fully hereinafter described, claimed and illustrated in the accompanying drawing in which:

Fig. 1 is an elevational end view of the detachable lug and tread plate or pad of an endless tread;

Fig. 2 is a vertical sectional view on the line 2—2 of Fig. 1, wherein spot welds are used to retain the detachable lug in fixed relation to the tread plate or pad of an endless tread;

Fig. 3 is a vertical sectional view, partly broken away, on the line 3—3 of Fig. 2 showing similar retaining means;

Fig. 4 is a perspective view of the detachable lug;

Fig. 5 is a top plan view, partly broken away, of the detachable lug showing the use of a hollow tubular stay-pin to retain the detachable lug in fixed relation to the tread plate or pad of an endless tread; and Fig. 6 is a longitudinal sectional view, partly broken away, on the line 6—6 of Fig. 5 showing similar retaining means.

Referring more in detail to the drawing, wherein like reference numerals designate like parts throughout, the reference numeral 10 designates a tread plate or pad of an endless tread. The face of the tread plate or pad being provided with conventional cleats or traction means 11, the parts so described being conventional and the novelty of the present invention residing in the manner of the attachment of a detachable lug 12 to the tread plate or pad 10 as will be later described.

The rear surface of the tread plate or pad 10 is provided with a dovetail groove or recess 13 which is adapted to receive a dovetailed base portion 14 of the detachable lug 12. When spot welds 15 are used, as shown in Figures 1 to 3 inclusive, to retain the lug 12 in fixed relation to the plate or pad 10, a continuous or harmonious unit is accomplished.

The base portion 14 is of rectangular formation, being as wide as the tread plate or pad 10 and as long as approximately one third of the length of the tread plate or pad 10.

The side edges of the base portion are straight, conforming to the side edges of the tread plate or pad 12, while the end edges are dovetailed as previously described.

Extending upwardly from the face of the base portion 14 in perpendicular relation thereto, are relatively spaced parallel linkage pin receiving portions 16 and 17, respectively. The interior faces 18 and 19, respectively, of the portions 16 and 17 are perpendicular to the face of the base portion 14, but the exterior faces 20 and 21, respectively, of the portions 16 and 17, respectively, are in acute angular relation to the face of the base portion 14.

Each of the linkage pin receiving portions 16 and 17, respectively, are provided with a pair of alined openings 22 which are positioned adjacent the outer edges of the linkage pin receiving portions 16 and 17, respectively. The openings being positioned in the linkage pin receiving portions 16 and 17, respectively, so that the openings in the linkage pin receiving portions are in diametrically alined relation to each other.

As shown in Fig. 2, the tread plate or pad 10 is provided with a centrally located opening 23 and the base portion 14 of the detachable lug 12 is provided with a centrally located opening 24 which is in direct alinement with the opening 23.

As shown in Figs. 5 and 6, a tubular hollow stay-pin 25, having an annular flange 26 on one end, is driven into the alined openings 23 and 24 to retain the detachable lug 12 in fixed relation to the tread plate or pad 10 in lieu of the use of the spot welds 15.

It will be also noted that the outer ends of the linkage pin receiving portions 16 and 17, respectively, are provided with rounded corners as at 27.

It is believed that the assembly of the detachable lug 12 and the tread plate or pad 10 will be clear to those skilled in the art and the use of the spot welds 15 or stay-pin 25 to retain the same in fixed relation to each other will also be obvious.

The removal of the lug for replacement being accomplished by the manual use of a hammer to remove the stay-pin or successive blows on the lug, breaking the spot welds so that the lug can be removed.

It is also to be understood that changes in the minor details of construction, arrangement or combination of parts may be resorted to provided they fall within the spirit of the invention or the scope of the appended claim.

Having thus described the invention what is claimed as new and desired to be secured by Letters Patent is:

A detachable lug for a tread plate of an endless tread having a transverse groove in the upper face thereof, said groove having upwardly and inwardly tapered sides, said lug comprising a base portion having upwardly and inwardly extending sides and receivable in said groove, and a pair of parallel linkage pin-receiving portions extending upwardly from said base portion in spaced parallel relation to each other.

References Cited in the file of this patent

UNITED STATES PATENTS

| | | |
|---|---|---|
| 1,041,450 | Drew | Oct. 15, 1912 |
| 1,370,379 | Straub | Mar. 1, 1921 |
| 2,211,896 | Johnston | Aug. 20, 1940 |
| 2,321,202 | Heine | June 8, 1943 |

FOREIGN PATENTS

| | | |
|---|---|---|
| 468,759 | Canada | Oct. 17, 1950 |
| 496,383 | France | Aug. 1, 1919 |